Nov. 10, 1931.  E. E. HARPER  1,831,596
COMBINATION MATERIAL FEEDING AND WEIGHING APPARATUS
Filed Dec. 27, 1928  2 Sheets-Sheet 1
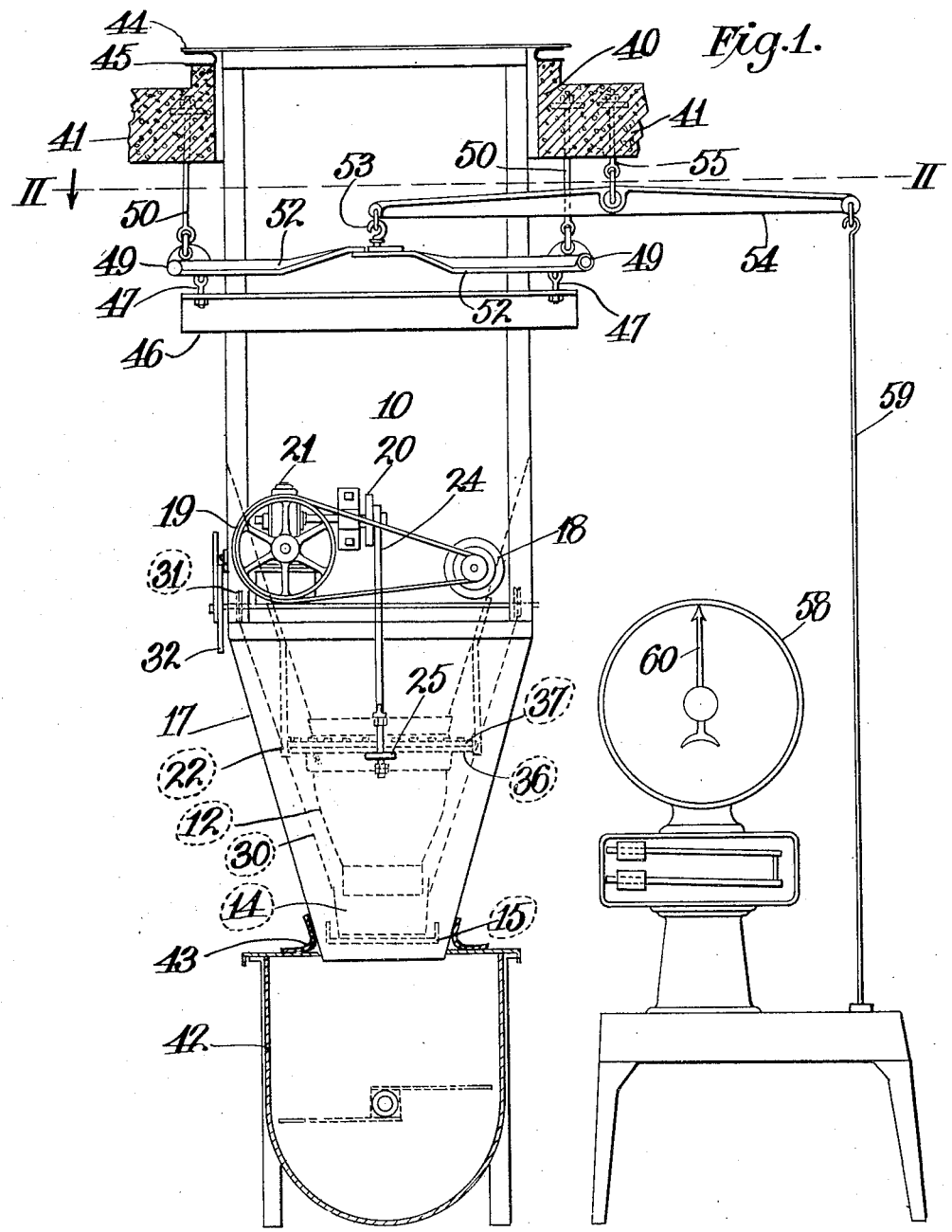
INVENTOR:
Elmer E. Harper
BY Charles V. Gerard,
ATTORNEY.

Nov. 10, 1931.  E. E. HARPER  1,831,596
COMBINATION MATERIAL FEEDING AND WEIGHING APPARATUS
Filed Dec. 27, 1928   2 Sheets-Sheet 2
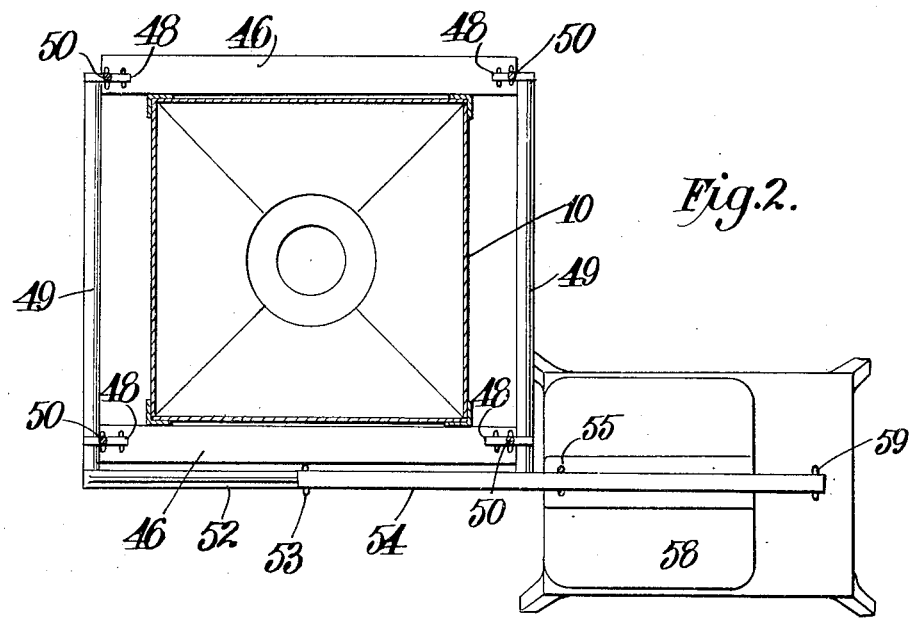
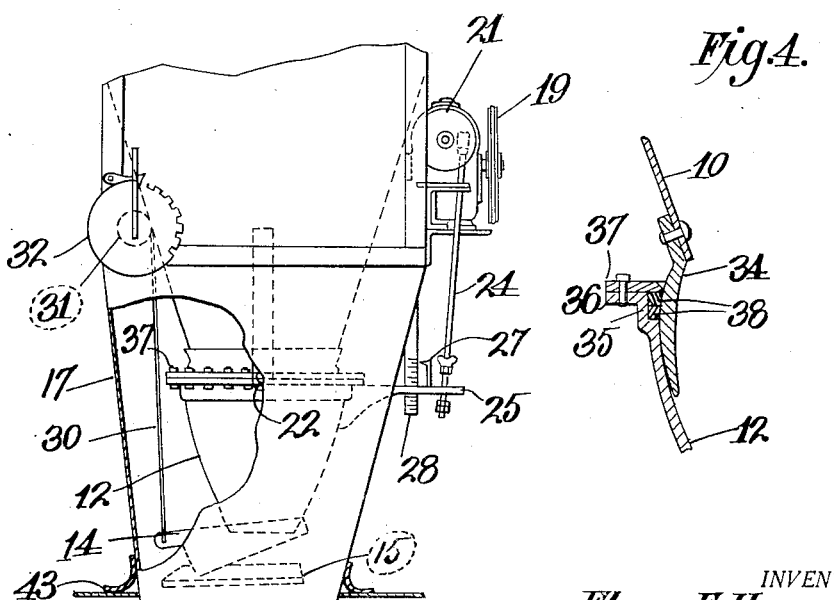
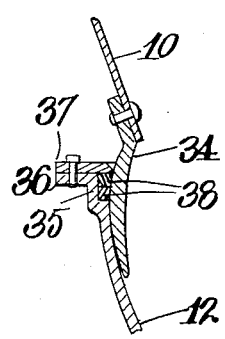
INVENTOR:
Elmer E. Harper
BY Charles W. Gerard
ATTORNEY.

Patented Nov. 10, 1931

1,831,596

UNITED STATES PATENT OFFICE

ELMER E. HARPER, OF KANSAS CITY, MISSOURI

COMBINATION MATERIAL-FEEDING AND WEIGHING APPARATUS

Application filed December 27, 1928. Serial No. 328,693.

The present invention relates to apparatus for the regulation of the feeding or dispensing of materials, such as chemicals or other materials which are required to be fed in regulated and measured quantities, as in water-treating or purifying plants and the like.

The primary purpose in view is to devise a material feeding or dispensing apparatus in which effective provision will be made for affording a constant, continuous and absolutely accurate record of the amount of material being delivered by the apparatus.

Accordingly, the present application discloses a combination material-feeding and weighing apparatus having suitable weighing means or mechanism incorporated as a part of the apparatus and forming an essential unit or element of the assembly, whereby the operation of the feeding or dispensing mechanism will be accompanied by a weighing function acting in unison with the feeding operation for constantly registering scale readings varying in accordance with the weight of the material that is being fed. In the construction disclosed herein, the apparatus includes means providing temporary storage for a quantity of the material, and weighing or scale mechanism operating in response to the action of the feeding mechanism for continuously and automatically registering the weight of the material remaining in the apparatus.

The invention further contemplates a form of combination material-feeding and weighing construction including a temporary material-storage unit and also weighing or scale mechanism constituting an essential unit of the apparatus and providing supporting means for the storage unit, and acting in unison with the material-feeding mechanism for simultaneously and automatically registering the weight of the material remaining within the storage unit.

With the foregoing general objects in view, as well as various minor objects hereinafter referred to, the invention will now be described by reference to the accompanying drawings, illustrating one practical form of construction for embodying the proposed improvements, after which those features and combinations deemed to be novel will be duly set forth and claimed.

In the drawings—

Figure 1 is an elevation, partly in section, illustrating a combination material-feeding and weighing apparatus, constructed in accordance with the present invention;

Figure 2 is a horizontal sectional and plan view of the same, representing a section taken on the line II—II of Figure 1;

Figure 3 is a fragmentary side elevation, partly broken away, of the lower portion of the material-feeding portion of the apparatus, being at right angles to the plane of Figure 1; and Figure 4 is an enlarged sectional detail of the dust-proof hopper joint, hereinafter described.

Referring now to the drawings in detail, these illustrate an apparatus comprising, as the material-feeding or dispensing unit thereof, a chemical feed machine of the same general character as that illustrated in my copending application Serial No. 268,516.

This material-feeding unit may be described briefly as comprising a main hopper chamber 10 for temporary storage of the material to be handled, an oscillating hopper member 12 communicating with the lower end portion of the hopper 10, a second oscillating or delivery hopper member 14 pivotally supported by the hopper 12 for intermittently discharging the material onto a relatively fixed tray or platform 15 located within the lower end of the housing 16 which is formed as an extension of the upper part of the main hopper 10, thus providing a cabinet 17 encasing these lower hoppers and tray and operating connections thereto. The feed motion of the hopper 12 is derived from a motor 18 belted to a wheel 19 which drives a crank disk 20 through a reduction gear 21, whereby said hopper is oscillated about an axis represented by its pivots 22 through the medium of a link 24 connecting said disk 20 with an arm 25 attached to one side of the hopper. The connection between the link 24 and arm 25 is adjustable and the amplitude of the movement imparted to the hopper 12 may be indicated as by the movement of an index 27 along a fixed scale 28.

The position of the lower hopper 14 may also be adjusted with reference to the hopper 12 by means of a flexible connection 30 with a sheave 31 and ratchet wheel 32, thereby regulating the rate of delivery or discharge of the material by varying the size of the discharge passage between the hoppers.

In this connection it is an object to improve the method in which the hoppers 10 and 12 are connected for providing a dust-proof joint, for which purpose the lower end of the hopper 10 has attached thereto a shoe or ring casting 34 having a convex outer surface, the curvature of which corresponds substantially to the radius of the oscillating movement of the upper portion of the hopper 12, the upper margin of which is also correspondingly shaped to loosely fit the outer face of said casting 34 as represented in Figures 3 and 4.

The upper portion of the hopper 12 is formed with a packing recess 35 and an outwardly projecting flange 36 to which is secured a retaining ring 37 for retaining suitable packing 38 within the recess 35 (see Figure 4). Such a construction obviously provides in effect a ball and socket union between the hoppers, which combined with the packing seal makes the connection practically dust-proof.

Figures 1 and 2 of the drawings show a practical method of combining the weighing or scale mechanism as a unitary part of the apparatus, by suspending the upper end of the main hopper 10 within a floor opening 40, formed within an overhead floor 41, the feed machine being so supported that its lower or discharge end will be in position to overhang and discharge into the appropriate mixing or material-treating chamber or receptacle, such as a lime-hydrating trough 42 as represented in Figure 1. Preferably the lower end or mouth of the machine will be fitted with a flexible dust-proof gasket 43, and the upper end of the machine carries a flange 44 similarly fitted with a flexible gasket 45 for making a dust-proof seal around the floor opening 40.

The supporting connection for suspending the feed machine by means of the scale mechanism is made by securing angle pieces 46 to the sides of the hopper 10 at some distance beneath the floor 41, the ends of these angle pieces being provided with swivel bolt connections 47 with the short arms 48 of the scale rocker devices 49 which are in turn pivotally suspended by supporting links 50 from the floor 41. The longer arms 52 of said rocker devices are arranged in the usual manner and provided with a connection 53 to one arm of the scale beam or lever 54 which is pivotally suspended intermediate its ends from the floor 41 by means of a link 55.

The other arm of the lever 54 is connected in any desired way to scale-indicating mechanism, according to conditions or the preferences of the user, as, for example, to a beam scales, or to a dial scales 58 as shown in Figure 1, in which construction a suitable link 59 is arranged between the lever 54 and the operating mechanism of said dial scales. Thus, as the load on the beam 54 varies, such variation will be registered automatically by the index member 60 of the dial scales 58, as will be readily understood.

The material to be handled by the feeding mechanism is of course placed in the main storage hopper 10 from above, and the feeding mechanism is operated in the manner described in said co-pending application above referred to. The total load or weight of the feeding machine and its contents will therefore be sustained by the scale beam 54, and the reading of the scales 58 will be registered accordingly. Thereafter as the contents of the hopper structure are diminished by the operation of the feeding mechanism, the scale mechanism will register the successive decrements in weight automatically and simultaneously, and continuously throughout the operation of the feeding mechanism. It is obvious that the scale readings on the dial scales 58 may be simply such as to register the successively diminishing weight of the feeding machine and its contents, or for greater convenience the scale dial may be graduated reversely, if preferred, for the purpose of registering cumulative readings corresponding to the totals of the successive increments of material delivered by the feeding mechanism into the mixing or treating chamber 42.

It will thus be apparent that a unitary and self-contained apparatus has been devised in which material-feeding or dispensing mechanism is associated with automatic weighing mechanism in one and the same assembly for simultaneously dispensing the material and automatically registering weight readings in such a manner that the operator in charge may know at any time the extent of the feeding machine's operation and the exact amount of material which has been discharged therefrom into the treating or mixing device on the floor below.

I am aware that hopper or bin structures have heretofore been mounted upon or supported by scale mechanisms, but it is believed to be new in this art to provide a combined unitary hopper and automatic feeding mechanism in conjunction with simultaneously operative weighing mechanism all in a self-contained apparatus for functioning in the manner above described.

It will be understood that the construction and arrangement of the apparatus herein set forth are merely illustrative and that various modifications thereof are of course possible within the scope of the invention, for meeting various conditions or requirements. Therefore, while I have illustrated and described one practical and efficient form or embodiment of the invention, I desire to reserve the right to make any changes or modifications which may fairly and properly fall within the scope of the appended claims.

Having described the invention, what I claim as new and desire to secure by Letters Patent is:

1. Material feeding and measuring apparatus comprising a floor-supported receptacle and a floor-supported scale device, a vertically movable hopper structure mounted in overhead relation and formed with an auxiliary cabinet portion having a discharge opening in dustproof communication with said receptacle, a scale beam having one end in sustaining relation to said hopper structure and its other end connected with said scale device, a movable hopper section carried by said hopper structure within said cabinet portion, and means operating automatically to impart oscillating movement to said movable hopper section for feeding material to said discharge opening.

2. Material feeding and measuring apparatus comprising a vertically movable hopper structure mounted in overhead relation and having a bottom discharge opening, a movable hopper section within the lower end of said structure, means operating automatically to impart an oscillating movement to said hopper section for feeding material therefrom to said discharge opening, and scale mechanism connected with said hopper structure for movably sustaining the same in suspended relation.

In witness whereof I hereunto affix my signature.

ELMER E. HARPER.